United States Patent
Artur Du Plessis et al.

(10) Patent No.: US 11,085,411 B2
(45) Date of Patent: Aug. 10, 2021

(54) VEHICLE ELECTRICAL STARTER CIRCUIT PROTECTION

(71) Applicant: VOLVO TRUCK CORPORATION, Gothenburg (SE)

(72) Inventors: Grégoire Artur Du Plessis, Greensboro, NC (US); Frédéric Leroy, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/980,080

(22) PCT Filed: Mar. 28, 2018

(86) PCT No.: PCT/EP2018/057958
§ 371 (c)(1),
(2) Date: Sep. 11, 2020

(87) PCT Pub. No.: WO2019/185141
PCT Pub. Date: Oct. 3, 2019

(65) Prior Publication Data
US 2021/0017944 A1   Jan. 21, 2021

(51) Int. Cl.
*F02N 11/08* (2006.01)
*B60R 16/03* (2006.01)
*F02D 41/20* (2006.01)

(52) U.S. Cl.
CPC .......... *F02N 11/0866* (2013.01); *B60R 16/03* (2013.01); *F02D 41/20* (2013.01);
(Continued)

(58) Field of Classification Search
CPC .... F02N 11/0866; F02N 11/10; F02N 11/108; F02N 2011/0885; F02N 2011/0888;
(Continued)

(56) References Cited

U.S. PATENT DOCUMENTS

2005/0224035 A1   10/2005   Burke et al.
2008/0303617 A1   12/2008   Schmidt et al.

FOREIGN PATENT DOCUMENTS

EP   2607178 A1   6/2013
GB   2471930 A    1/2011
(Continued)

OTHER PUBLICATIONS

International Search Report and Written Opinion dated Nov. 28, 2018 in corresponding PCT Application No. PCT/EP2018/057958, 11 pages.

*Primary Examiner* — Hai H Huynh
(74) *Attorney, Agent, or Firm* — Venable LLP; Jeffri A. Kaminski

(57) ABSTRACT

An electrical system for a vehicle having a chassis ground (G0) and an engine having an engine ground (G1), the system comprising a first electrical energy storage device (1), denoted EESD1, a second electrical energy storage device (2), denoted EESD2, a starter device (3) having a starter motor (30), a generator (4), a first cable (61) coupling a positive terminal (1+) of EESD1 to the positive terminal (3+) of the starter device, a second cable (62) coupling the positive terminal (4+) of the generator to a positive terminal (2+) of EESD2, a third cable (63) coupling a negative terminal (1−) of EESD1 to the negative terminal (3−) of the starter device, a control unit (5) for controlling the charge of EESD1, a fusible link (66,7) coupling a negative terminal (1−) of EESD1 to the chassis ground (G0).

14 Claims, 3 Drawing Sheets

(52) U.S. Cl.
CPC ............... *F02D 2041/2093* (2013.01); *F02N 2011/0885* (2013.01); *F02N 2011/0888* (2013.01)

(58) Field of Classification Search
CPC . B60R 16/03; F02D 41/20; F02D 2041/2093; H02J 7/0029; H02J 7/1423; H02J 7/0031; H02J 2310/46
USPC ........................... 123/179.1, 179.25, 179.28
See application file for complete search history.

(56) References Cited

FOREIGN PATENT DOCUMENTS

| | | |
|---|---|---|
| WO | 0207286 A1 | 1/2002 |
| WO | 2017108086 A1 | 6/2017 |

VEHICLE ELECTRICAL STARTER CIRCUIT PROTECTION

CROSS-REFERENCE TO RELATED APPLICATIONS

This application is a U.S. National Stage application of PCT/EP2018/057958, filed Mar. 28, 2018, and published on Oct. 3, 2019, as WO 2019/185141 A1, all of which is hereby incorporated by reference in its entirety.

FIELD OF THE INVENTION

The present invention relates to systems and methods for improving electrical starter circuit protection for vehicles, notably in the frame of electrical power supply architecture in trucks and buses.

BACKGROUND OF THE DISCLOSURE

Recent vehicles like trucks and buses exhibit generally good reliability record. In this general context, the electrical circuit must be designed to undergo a possible short-circuit to ground. This can occur if a foreign object like a screw happen to be inserted in the insulation layer of a wire. This can also occur in case of mechanical damage suffered from a light or severe vehicle crash. This can also occur in case of mechanical wear occurring in the long run on electrical cables if they are submitted to friction.

Notably when positive supply lines happen to undergo a short-circuit to ground, they must be protected against overheating and possible burn of the insulation layer. As known per se, overheating of the insulation layer may induce melting of the latter and entails burning of neighboring cable, and this can lead to permanent short circuit between wires and sometimes local start of fire.

Usually a blow fuse is a good solution to protect electrical wires from such short-circuit occurrence.

However, in the case of the starter cable which supplies the starter motor with electrical energy, the operative current that is so high the blow fuse solution is hardly or not available at all.

Especially in the case of trucks and buses, there is no fuse available with so high rating that can at the same time withstand the normal operative current without blowing and efficiently protect the cable against a possible short-circuit to ground.

Under another perspective, electrical power supply architecture in trucks and buses often exhibit two set of batteries, one dedicated to engine starting function and another one which support various service electrical consumption that is rendered necessary by the driver's activity when the driver makes a stop, especially a long stop such as a night stop. First and second battery systems in such so-called "dual batteries system" are independent to some extent.

WO2017108086 gives an example of dual batteries electrical power architecture.

The inventors have found that there remains a need to improve electrical starter circuit protection for vehicles, notably for trucks and buses.

SUMMARY OF THE DISCLOSURE

According to one aspect of the present invention, it is disclosed an electrical system for a vehicle having a chassis ground and an engine having an engine ground, the system comprising:

a first electrical energy storage device, denoted EESD1 (1),
a second electrical energy storage device, denoted EESD2 (2),
a starter device (3) having a starter motor (30),
a generator (4),
a first cable coupling (directly) a positive terminal of EESD1 to the positive terminal of the starter device,
a second cable coupling (indirectly) the positive terminal of the generator to a positive terminal of EESD2,
a third cable coupling (directly) a negative terminal of EESD1 to the negative terminal (3−) of the starter device,
a control unit (5) for controlling the charge of EESD1,
a fusible link coupling a negative terminal (1−) of EESD1 to the chassis ground G0.

Thanks to these dispositions, a short-circuit to ground (engine G1 or chassis G0) occurring at the first cable (61) or at the positive terminal (3+) of the starter motor or at the positive terminal (1+) of EESD1 triggers the disconnection of the fusible link, while at the same time the living circuit (namely the circuit comprising EESD2+second cable+generator+engine ground (G1) and chassis ground (G0) remains operative.

This layout also improves diagnostic capability, since a floating condition can be determined by the control unit (5), which still operates even after fusible link disconnection.

The present document shall be read in light of the following terms definition.

Definition of "coupling": establishing electrical continuity between two elements, either directly or indirectly, via one or more other conductive elements.

Definition of "cable": electrically conductive elongated member, can be a flexible lead, can be a somewhat rigid lead. Usually a cable includes a conductive core and a protective insulative layer.

Definition of "terminal": part for electrical connection intended to be electrically connected by contact to a counterpart by mating, screwing, splicing, spring contact or any contact method.

Further, for the sake of text conciseness, the first (respectively second) electrical energy storage device is called in short EESD (EESD1 respectively EESD2).

In various embodiments of the invention, one may possibly have recourse in addition to one and/or other of the following arrangements, taken alone or in combination.

According to one particular option, the chassis ground (G0) and the engine ground (G1) are coupled via a fourth cable (64). Thereby, this fourth cable provides ground continuity between engine and chassis. Further, this fourth cable is involved in the short circuit occurrence but is not involved in the starting circuit loop.

According to one particular option, the starting circuit loop comprising the first electrical energy storage device (1), the first cable (61), the starter motor (30) and the third cable (63) is preferably deprived of fusible link or circuit breaker. This circuit can thus withstand a high current flow. The cables of this starting circuit loop are preferably exhibit a low resistance, and therefore the voltage drop across the cables are low even when high current run through.

According to one particular option, the control unit (5) is configured to control the recharge of EESD1 and isolates selectively EEDS1 from EEDS2. After starting the engine, the EESD1 needs to be recharged for the next starting; however after recharging, EESD1 should be isolated from EESD2 since EESD2 can be discharged to some extent (or even deeply) by electrical consumption with engine stopped (ex: night stop, driver cooking, heating, air conditioning, . . . ).

According to one particular option, the control unit (5) is configured to detect a floating ground condition for EESD1, for diagnosis function, in particular for detecting a disconnection of the fusible link. This allows the driver to be warned, including while the engine is still running, and the driver is able to drive to a service center to have the problem fixed. Advantageously, no emergency stop is required.

According to one particular option, the generator (4) outputs a voltage having a value above 24 volts. Whereby the proposed electrical system is particularly relevant for trucks, busses and for any kind of heavy-duty vehicles.

According to one particular option, the starter motor has a nominal cranking current having a value above 200 Amperes under 24 volts, and a peak value above 700 Amperes under 24 volts. Whereby the proposed electrical system is particularly relevant for trucks, busses and for any kind of heavy-duty vehicles having a large displacement engine.

According to one particular option, the fusible link may include a fuse, preferably a blow fuse, preferably a blow fuse having a rating comprised between 30 Amp and 80 Amp, preferably a 40 Amp fuse. This forms a reliable and well known solution for disconnection in case of overcurrent.

According to one particular option, the fusible link may include a circuit breaker. This forms a resettable solution. Such circuit breaker includes an overcurrent sensing element which triggers the opening of a power switch arranged in series on the fusible link.

According to one particular option, the fusible link may include a pyrotechnic device. This device can be remotely controlled either by the electrical network monitoring unit, or by another device like airbag unit.

According to one particular option, the first electrical energy storage device EESD1 comprises an ultracapacitor (otherwise called supercapacitor), and is power-optimized. High current draw can be outputted therefrom to deliver enough power to the powerful starter device.

Alternatively, the first electrical energy storage device EESD1 can be of Lead acid type, gel-type AGM battery or of any other type of battery.

According to one particular option, the control unit (5) comprises a DC/DC converter. Whereby, adequate voltage can be supplied to EESD1 in order to properly recharge EESD1.

According to one particular option, the second electrical energy storage device EESD2 is energy-optimized. This is relevant, reliable and convenient for long stays, night stops and the like.

According to one particular option, the generator is coupled to the positive terminal of EESD2 via a fuse box (81). All downstream cables can therefore be protected.

According to one particular option, the system may comprise both 24 volts loads and 12 volts loads. The proposed solution is compatible with dual voltage systems.

The invention is also directed to a vehicle including an electrical system as described above.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements.

Figure 1:
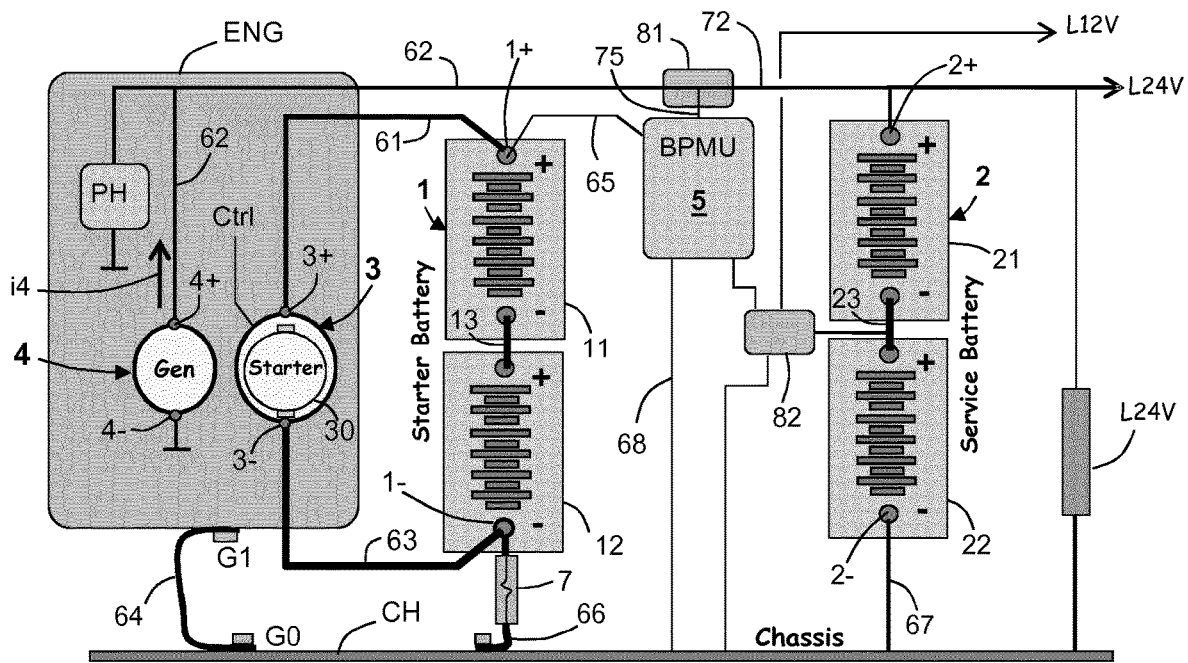
FIG. 1 illustrates a diagrammatical electrical circuit layout of a system according to the invention.

FIG. 1 shows a diagrammatical electrical circuit layout of an electrical system for a truck. The proposed configuration is also valid for any kind of heavy-duty vehicles including buses and coaches.

First there is provided a chassis ground denoted G0. The chassis is also called 'frame' The chassis ground is the voltage reference '0V' and conveys the ground currents generally at a voltage very close to 0V.

On the engine, there is provided a starter device 3. As known per se, the starter device 3 includes a starter motor 30, a coil controlled coupling arrangement and often a reduction gear interposed between the starter motor and an output pinion which can be engaged with a crankshaft.

On the engine, there is provided an alternator 4 (likewise called 'generator').

There is also provided an engine ground denoted G1. The engine ground is coupled to the chassis ground G0 by a strong wire or a braid or a solid metal linkage (ref 64 at FIG. 1). The engine ground G0 conveys the ground currents from the alternator 4 and from the preheaters PH and from other engine ancillaries.

EESD1 & EESD2

There is also provided a first electrical energy storage device 1, likewise called in short EESD1 for the sake of conciseness. EESD1 is dedicated to the engine starting function.

Engine Control Unit and other auxiliary elements necessary for engine start can be supplied by EESD1. Preheater PH can be supplied from EESD2 as shown. In another variant, Preheater PH can be supplied from EESD1. Generally speaking, it is considered that all components and ancillaries necessary for effective engine starting can be electrically powered from EESD1.

There is also provided a control unit 5 for controlling the charge of EESD1 from the electrical power supplied by the generator 4 when the engine is running.

The control unit 5 can also be called Battery Protection & Monitoring control unit, in short BPMU. Functions of the control unit 5 will be reviewed later on.

In one embodiment the first electrical energy storage device EESD1 is formed as a conventional battery as illustrated in FIG. 1. More precisely, in the illustrated example, EEDS1 is formed by two 12 volts batteries arranged in series. A first 12V battery 11 and a second 12V battery 12 are arranged in series and coupled together by a shunt/bridge 13.

However a single 24 volts battery can also be considered. In another configuration (not shown), EEDS1 can be formed by a single 12 volts battery, since the present invention can be carried out in a 12V electrical network.

Figure 2:
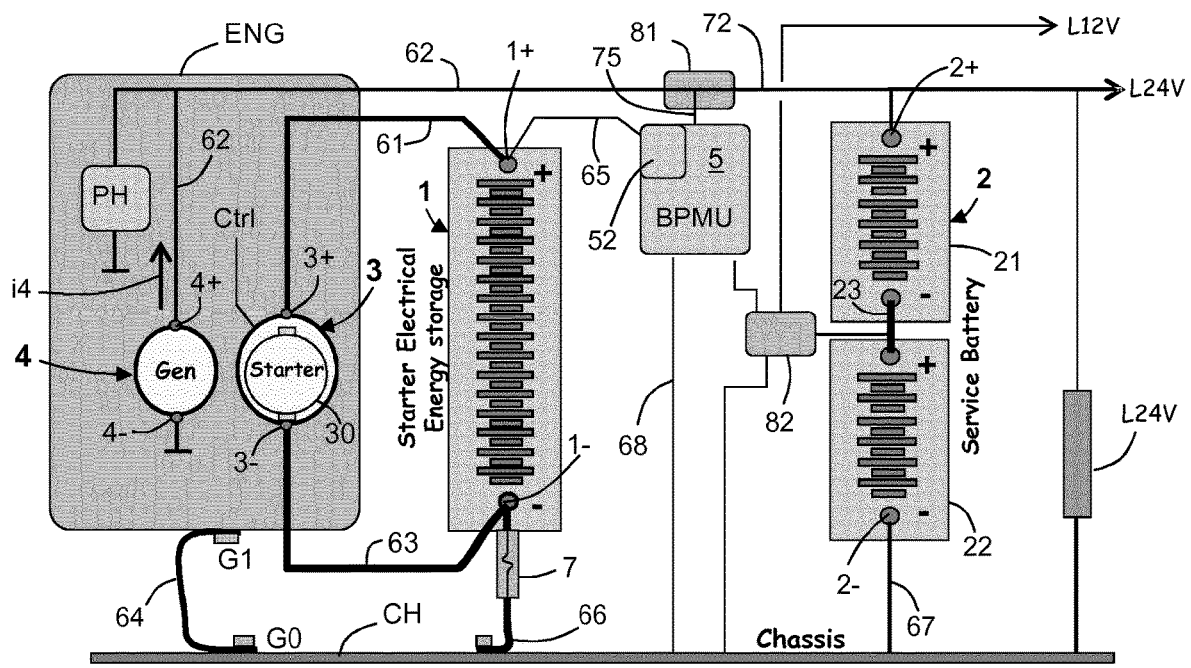
FIG. 2 illustrates a variant diagrammatical electrical circuit layout of a system according to the invention.

In another embodiment, as illustrated in FIG. 2, the first electrical energy storage device EESD1 comprises an ultracapacitor (otherwise called supercapacitor). Since the voltage across the ultracapacitor depends on the energy stored, there is provided a DC/DC converter 52 at the control unit 5. Adequate charge voltage can be supplied to EESD1 in order to properly recharge EESD1.

The EESD1 is generally power-optimized. EESD1 can output a power greater than 2 kW. Typically the power output by EESD1 is greater than 3 kW, comprised in practice between 3 kW and 10 kW, to properly supply the same power starter motor 30.

There is also provided a second electrical energy storage device 2, likewise called in short EESD2. EESD2 is configured to support various service electrical consumption that is rendered necessary by the driver's activity when the driver makes a stop, especially a long stop such as a night stop. The second electrical energy storage device EESD2 is energy-optimized.

More precisely, in the illustrated example, EEDS2 is formed by two 12 volts batteries arranged in series. A first 12V battery 21 and a second 12V battery 22 are arranged in series and coupled together by a shunt/bridge 23.

A configuration with [2+2] 12 volts batteries is also encompassed, namely a first couple of two batteries in parallel, arranged in series with another, second couple of two batteries in parallel.

EESD2 is typically of Lead Acid technology, well known and cost effective.

Energy stored in EESD2 is typically at least 80 Ah, very often at least 100 Ah.

Wiring & Fusing

A first cable 61 couples a positive terminal 1+ of EESD1 to the positive terminal 3+ of the starter device. It should be noted he term 'pole' is sometimes used instead of 'terminal'.

A 'cable' is also called a 'lead' or a 'conductor'. Power cables are able to withstand several dozens of Amps, with a resistivity of no more than 0.005 Ω/m, are generally large cross section copper wire. Alternatively the core can be made of copper alloy or aluminum alloy.

It should be noticed that cable 61 couples directly the EESD1 to the positive terminal 3+ of the starter device, with a minimal resistance, although one in-line connector is possible.

A second cable 62 couples, here indirectly, the positive terminal 4+ of the generator to a positive terminal 2+ of EESD2. The generator 4 supplies EESD2 and other loads and components via a fuse box 81.

As known per se, the fuse box comprises a busbar to split and distribute power supply; the fuse box comprises fuses to protect downstream cables 72 and devices L24V from overcurrent. Here the fuse box 81 is a 24V fuse box; however, it could be also a 12V fuse box.

A third cable 63 couples, preferably directly, a negative terminal 1− of EESD1 to the negative terminal 3− of the starter device. It should be noted that one in-line connector is possible.

The starting circuit loop comprises the first electrical energy storage device 1, the first cable 61, the starter motor 3 and the third cable 63 with a minimal overall resistance and the starting circuit loop can thus withstand a high current flow with low voltage drop.

The starting circuit loop is preferably deprived of fusible link or circuit breaker in order to achieve a low overall resistance, and therefore a low voltage drop across the cables (even when high current run through).

The first cable 61 and the third cable 63 can have cross section of at least 10 mm². They support the cranking current. Length of first cable 61 and the third cable 63 is generally comprised between 2 m and 5 m.

Peak current is typically 1500 A under 24V and typically 3000 A under 12V.

The chassis ground G0 and the engine ground G1 are coupled via a fourth cable 64, through which the cranking current does not run.

There is provided a fusible link that couples the negative terminal 1− of EESD1 to the chassis ground G0.

The fusible link comprises a cable 66 and a fuse 7. The cranking current does not run through the fusible link. The recharge current of EESD1 runs through the fusible link comprising a cable 66 and a fuse 7. Fuse rating is chosen to bear this recharge current, in view of the technology type of EESD1. Fuse rating can be comprised between 30 Amp and 80 Amp. Preferably a 40 Amp fuse can be chosen if EESD1 is Lead Acid type.

The positive link coupling the control unit 5 to EESD1 is denoted 65. The cranking current does not run through the positive recharge link 65.

The control unit 5 is supplied by a positive lead 75 from the fuse box 81 and a negative lead 68 coupled to the chassis ground G0.

EESD2 is connected to the chassis ground G0 via a ground cable denoted 67.

There is provided a jump start device 87 with positive and negative terminals.

Optionally, there may be provided a 12V subnetwork with a 12 v fuse box 82 arranged to supply 12 volts loads and devices denoted L12V.

When the engine is running, the generator outputs a current denoted i4, this current is regulated either basically according to a voltage setpoint, or on a more elaborate manner according to the power demand which is generally sensed by the voltage and/or the current downstream the fuse box 81.

How it Works

Figure 3:
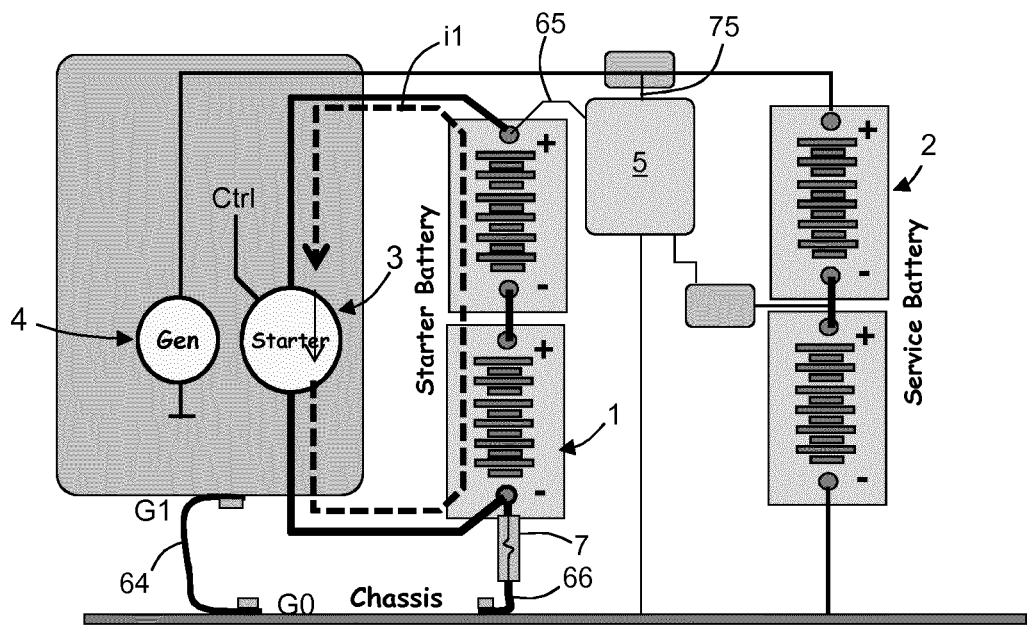
FIG. 3 shows the starting sequence.

When the key or equivalent means is activated to start the cranking sequence, as shown in FIG. 3, current i1 runs through the starting circuit loop.

Cranking current i1 raises typically at 1500 A under 24V (resp. typically 3000 A under 12V) at early activation and null RPM.

After what, there is a 'cruise' rotation exhibiting an undulated current typically comprised between 150 A and 300 A under 24V (resp. between 300 A and 600 A under 12V).

Figure 4:
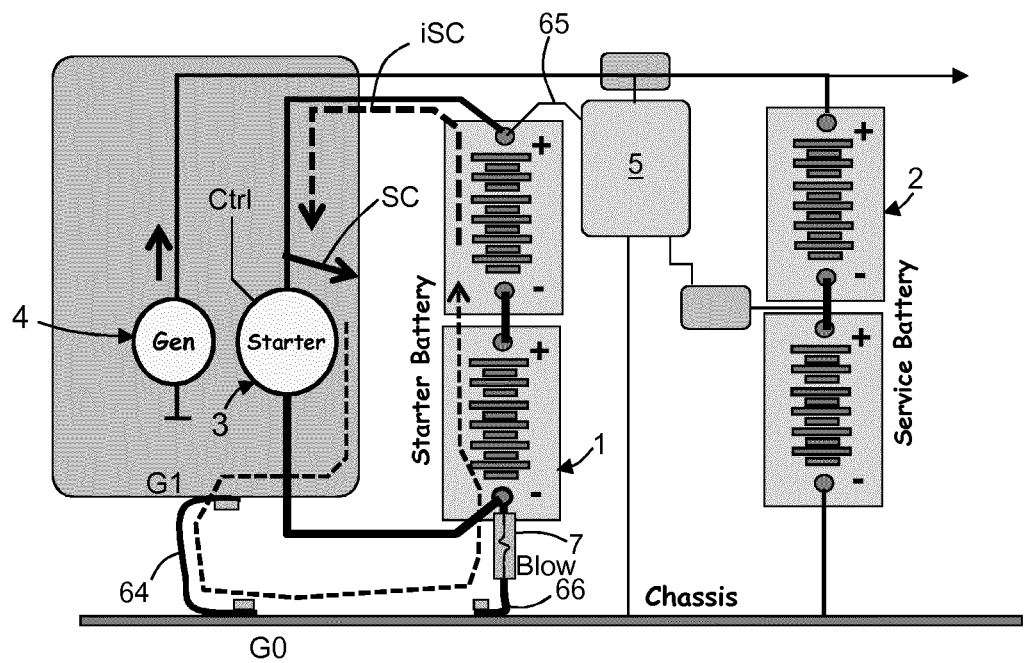
FIG. 4 shows an occurrence of a short-circuit to ground.

When/if a short-circuit to G1/G0 occurs at the first cable 61 or at the starter device (positive terminal 3+ or elsewhere in the starter device), schematically illustrated by SC, as shown in FIG. 4, a disconnection of the fusible link is to occur.

Figure 5:
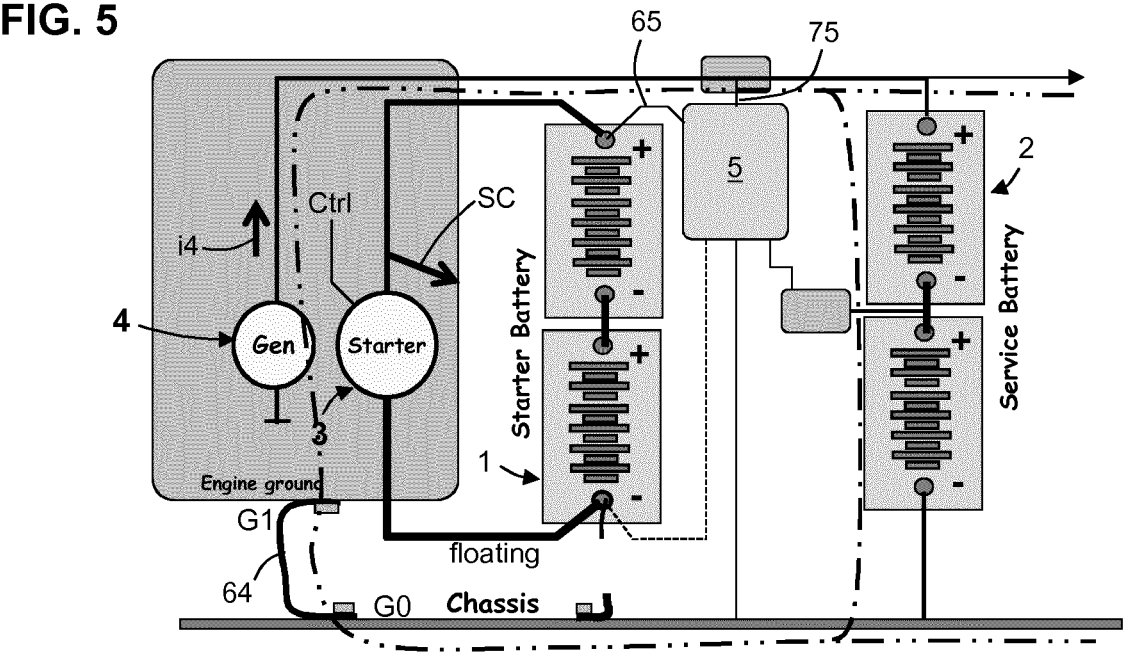
FIG. 5 illustrates the configuration after the protection fuse has been blown.

The short-circuit current iSC is greater than the rating of the fuse 7. Therefore the fuse 7 blows and the circuit becomes open at this place (see FIG. 5).

The short-circuit path (shown in dotted line) does not go through the third cable 63, but goes through the fourth cable 64.

Even though the short-circuit still exists, the 'living circuit' comprising 2+62+4+G1+G0 (chain-dot line at FIG. 5) remains operative, and the engine can still go on running and all service functions remain available except a new cranking sequence and a recharge of EESD1. The battery control unit 5 still operates normally.

Figure 6:
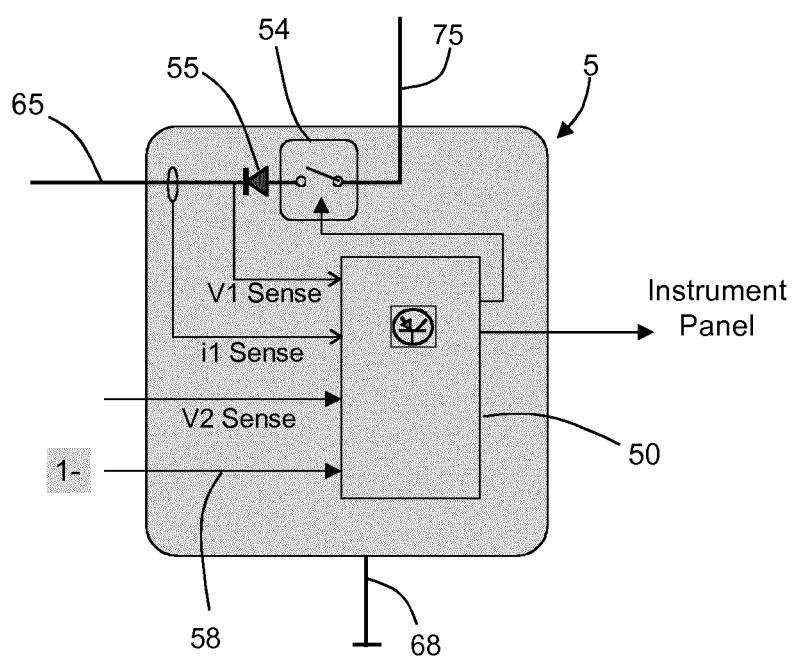
FIG. 6 illustrates part of the battery control unit.

As illustrated in FIG. 6, the battery control unit 5 includes a controller 50 and a switch 54 configured to allow the recharge of EESD1 or to isolate EESD1 from EESD2. The switch 54 can be a relay or can be a semiconductor switch. It should be noted that the cranking current i1 does not run through this switch 54.

There can be provided additionally a diode 55, to prevent any current return from EESD1 to EESD2 in case EESD2 begins to be lower in voltage, EESD1 should not undergo a discharge to preserve next starting phase.

Regarding the detection and diagnosis of the fusible link disconnection, there is provided a voltage level detection V1sense to acquire voltage V1 prevailing at EESD1. There is also provided a voltage level detection V2sense to acquire voltage V2 prevailing at EESD2.

There may be provided additionally a current sensing arrangement (i1Sense) to sense recharging current running through EESD1.

There may be provided additionally a EESD1 ground sensing arrangement, with a wire 58 coupling the negative terminal 1− of EESD1 to the controller 50.

The floating condition can be detected in several different ways, either by detecting that EESD1 ground sensing gives a voltage substantially higher than expected, or if no current at all runs through the current sensing arrangement i1Sense.

If a floating condition is determined, then the controller 50 delivers a message to the instrument panel, so that the driver is warned about the current situation.

This allows the driver to be notified, notably while the engine is still running, and the driver is able to drive to a service center to have the problem fixed. Advantageously, no emergency stop is required, it decreases the risk of traffic incident.

Miscellaneous

Instead of the fuse, the fusible link can comprise a resettable circuit breaker. Such circuit breaker includes an overcurrent sensing element which triggers the opening of a power switch arranged in series on the fusible link. Alternatively, the fusible link can comprise a pyrotechnic device which can be triggered remotely controlled either by the electrical network monitoring unit, or by another device like airbag unit or the like.

The invention claimed is:

1. An electrical system for a vehicle having a chassis ground (G0) and an engine having an engine ground (G1), the system comprising:
   a first electrical energy storage device, denoted EESD1,
   a second electrical energy storage device, denoted EESD2,
   a starter device having a starter motor,
   a generator,
   a first cable coupling a positive terminal of EESD1 to the positive terminal of the starter device,
   a second cable coupling the positive terminal of the generator to a positive terminal of EESD2,
   a third cable coupling a negative terminal of EESD1 to the negative terminal of the starter device,
   a control unit for controlling the charge of EESD1,
   a fusible link coupling a negative terminal of EESD1 to the chassis ground (G0).

2. The electrical system according to claim 1, wherein the chassis ground (G0) and the engine ground (G1) are coupled via a fourth cable.

3. The electrical system according to claim 1, wherein the starting circuit loop comprising the first electrical energy storage device, the first cable, the starter motor and the third cable is deprived of fusible link or circuit breaker.

4. The electrical system according to claim 1, wherein the control unit is configured to control the recharge of EESD1 and to isolate selectively EEDS1 from EEDS2.

5. The electrical system according to claim 1, wherein the control unit is configured to detect a floating ground condition for EESD1, for diagnosis function, in particular for detecting a disconnection of the fusible link.

6. The electrical system according to claim 1, wherein the generator outputs a voltage having a value above 24 volts.

7. The electrical system according to claim 1, wherein the starter motor has a nominal cranking current having a value above 200 Amperes under 24 volts, and a peak value above 700 Amperes under 24 volts.

8. The electrical system according to claim 1, wherein the fusible link includes a fuse, preferably a blow fuse.

9. The electrical system according to claim 1, wherein the first electrical energy storage device EESD1 comprises an ultracapacitor and is power-optimized.

10. The electrical system according to claim 9, wherein the control unit comprises a DC/DC converter.

11. The electrical system according to claim 1, wherein the second electrical energy storage device EESD2 is energy-optimized.

12. The electrical system according to claim 1, wherein the generator is coupled to the positive terminal of EESD2 via a fuse box.

13. The electrical system according to claim 1, comprising both 24 volts loads and 12 volts loads.

14. A Vehicle comprising an electrical system according to claim 1.

* * * * *